(12) United States Patent
Chen et al.

(10) Patent No.: US 10,785,467 B2
(45) Date of Patent: Sep. 22, 2020

(54) 3D SENSING CAMERA OF ELECTRONIC DEVICE

(71) Applicant: TRIPLE WIN TECHNOLOGY(SHENZHEN) CO. LTD., Shenzhen (CN)

(72) Inventors: Shin-Wen Chen, New Taipei (TW); Ye-Quang Chen, New Taipei (TW); Jing-Wei Li, Guangdong (CN); Sheng-Jie Ding, Guangdong (CN); Chia-Wei Chen, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 130 days.

(21) Appl. No.: 16/248,996

(22) Filed: Jan. 16, 2019

(65) Prior Publication Data

US 2020/0169721 A1   May 28, 2020

(30) Foreign Application Priority Data

Nov. 27, 2018   (CN) .......................... 2018 1 1428347

(51) Int. Cl.
| | |
|---|---|
| *H04N 13/257* | (2018.01) |
| *H04N 9/07* | (2006.01) |
| *H04N 13/25* | (2018.01) |
| *H04N 5/225* | (2006.01) |

(52) U.S. Cl.
CPC ......... *H04N 13/257* (2018.05); *H04N 5/2253* (2013.01); *H04N 9/07* (2013.01); *H04N 13/25* (2018.05); *H04N 2213/001* (2013.01)

(58) Field of Classification Search
CPC ................. H04N 13/25; H04N 13/257; H04N 2213/001; H04N 5/2253; H04N 9/07
See application file for complete search history.

(56) References Cited

U.S. PATENT DOCUMENTS

| | | | | |
|---|---|---|---|---|
| 3,457,364 A | * | 7/1969 | Carrillo | H04N 13/302 348/47 |
| 4,751,570 A | * | 6/1988 | Robinson | H04N 13/239 348/47 |
| 6,320,610 B1 | * | 11/2001 | Van Sant | G06K 9/00604 348/143 |
| 9,277,203 B2 | * | 3/2016 | Riederer | H04N 13/133 |
| 10,334,225 B2 | * | 6/2019 | Riederer | G09G 5/363 |
| 2009/0041309 A1 | * | 2/2009 | Kim | G06K 9/00604 382/117 |

* cited by examiner

*Primary Examiner* — Gelek W Topgyal
(74) *Attorney, Agent, or Firm* — ScienBiziP, P.C.

(57) ABSTRACT

A 3D sensing device includes a base, an infrared emitting module, a first infrared receiver, a second infrared receiver, a color camera module, a first moving member, a second moving member, a first driving member, and a second driving member. The first moving member and the second moving member are slidably mounted on the base. The first driving member and the second riving member respectively drive the first moving member and the second moving member to slide along the base. The infrared emitting module is mounted on the first moving member. The color camera module is located between the first infrared receiver and the infrared emitter. The second infrared receiver is mounted on the second moving member. The first moving member and the second moving member respectively move the infrared emitting module and the second infrared receiver along the base relative to the first infrared receiver.

16 Claims, 4 Drawing Sheets

3D SENSING CAMERA OF ELECTRONIC DEVICE

FIELD

The subject matter herein generally relates to electronic devices, and more particularly to a 3D sensing camera of an electronic device.

BACKGROUND 3D image acquisition is a means of acquiring image information and has a wide range of applications in daily life, biomedical fields, aerospace, and other fields. Generally, a 3D image sensing device is fixed within a range of use and cannot achieve deeper and wider image acquisitions, which limits developments and applications of 3D image acquisition technology.

BRIEF DESCRIPTION OF THE DRAWINGS

Implementations of the present disclosure will now be described, by way of embodiments, with reference to the attached figures.

DETAILED DESCRIPTION

Figure 1:
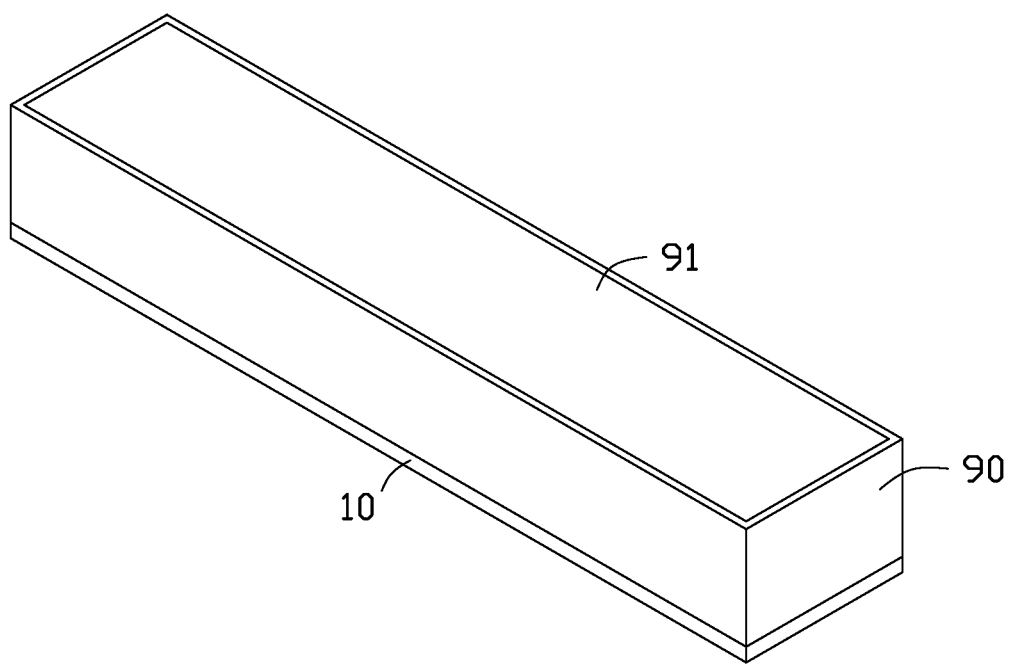
FIG. 1 is an isometric view of an embodiment of a 3D sensing device.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as coupled, whether directly or indirectly through intervening components, and is not necessarily limited to physical connections. The connection can be such that the objects are permanently coupled or releasably coupled. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 2:
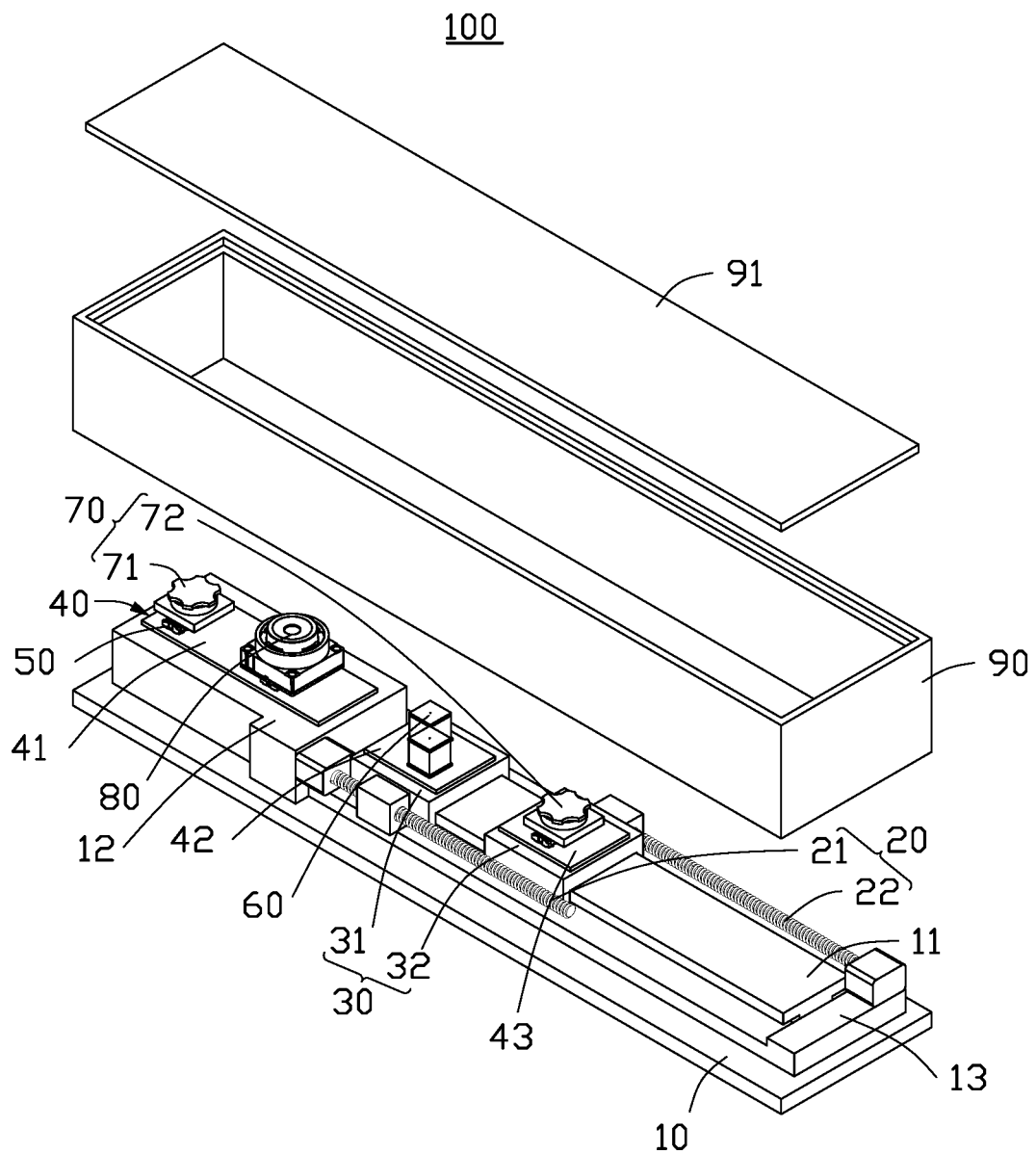
FIG. 2 is a partially exploded view of the 3D sensing device in FIG. 1.

Referring to FIG. 1 and FIG. 2, a 3D sensing device 100 capable of automatically adjusting a breadth and depth of sensing a target object. The 3D sensing device 100 includes a base 10, a driving assembly 20, a moving assembly 30, an infrared emitting module 60, an infrared receiving module 70, and a color camera module 80.

The base 10 is substantially rectangular. The driving assembly 20, the moving assembly 30, the infrared emitting module 60, the infrared receiving module 70, and the color camera module 80 are all mounted on the base 10. A sliding rail 11 is mounted on the base 10. The base 10 is made of plastic, glass, wood, ceramic, metal, composite material, or the like. One end portion of the base 10 has mounted a first protrusion 12, and a second end portion of the base 10 has mounted a second protrusion 13. The first protrusion 12 and the second protrusion 13 are substantially cuboid.

Figure 3:
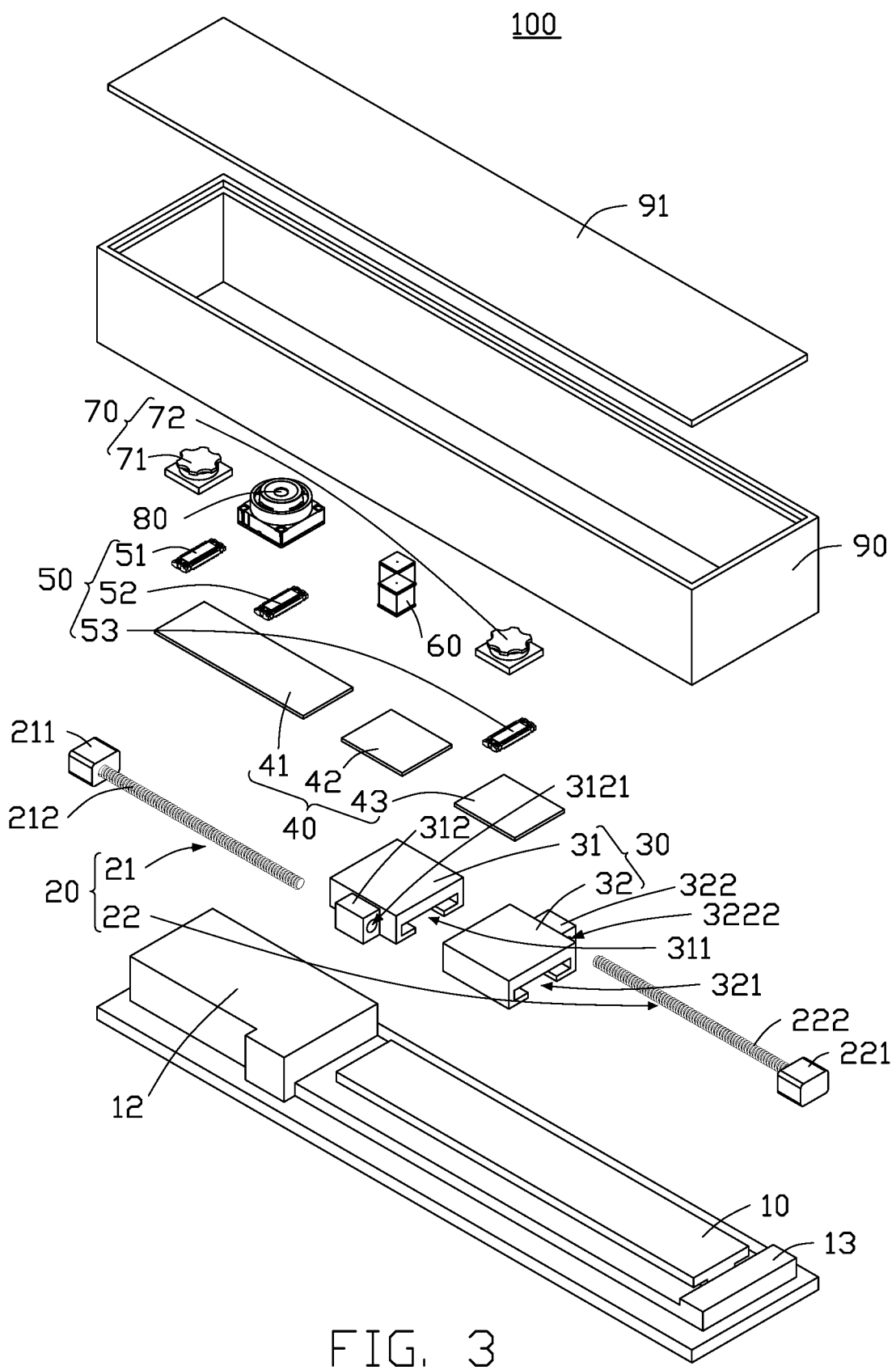
FIG. 3 is an exploded view of the 3D sensing device in FIG. 1.

Referring to FIG. 3, the driving assembly 20 includes a first driving member 21 and a second driving member 22. The first driving member 21 and the second driving member 22 are respectively located on two sides of the sliding rail 11. In one embodiment, the first driving member 21 includes a first motor 211 and a first screw 212 coupled to the first motor 211. The second driving member 22 includes a second motor 221 and a second screw 222 coupled to the second motor 221. The first screw 212 and the second screw 222 are respectively located on two sides of the sliding rail 11. In other embodiments, the first and the second motors 211 and 221 can be replaced with other power devices. The first driving member 21 is coupled to the first protrusion 12 by the first motor 211, and the first screw 212 is located between the first protrusion 12 and the second protrusion 13. The second driving member 22 is coupled to the second protrusion 13 through the second motor 221, and the second screw 222 is located between the first protrusion 12 and the second protrusion 13. The first motor 211 and the second motor 221 respectively drive the first driving member 21 and the second driving member 22 to respectively drive the first screw 212 and the second screw 222 to rotate.

The moving assembly 30 includes a first moving member 31 and a second moving member 32. The first moving member 31 and the second moving member 32 are slidably mounted on the sliding rail 11 of the base 10, and the first moving member 31 is located between the first protrusion 12 and the second moving member 32. In one embodiment, a bottom of the first moving member 31 facing the sliding rail 11 defines a first sliding slot 311, and a bottom of the second moving member 32 facing the sliding rail 11 defines a second sliding slot. The first sliding slot 311 receives the sliding rail 11 to allow the first moving member 31 to slide along the sliding rail 11, and the second sliding slot 321 receives the sliding rail 11 to allow the second moving member 32 to slide along the sliding rail 11. The first moving member 31 includes a first connecting block 312 on a side of the first moving member 31 adjacent to the first driving member 21, and the second moving member 32 includes a second connecting block 322 on a side of the second moving member 32 adjacent to the second driving member 22. The first connecting block 312 defines a first opening 3121. An axis of the first opening 3121 is coaxial with an axis of the first driving member 21. The second connecting block 322 defines a second opening 3222. An axis of the second opening 3222 is coaxial with an axis of the second driving member 22. Inner surfaces of the first opening 3121 and the second opening 3222 include threads (not shown) that mate with the first screw 212 and the second screw 222, respectively. The first screw 212 is rotatably received in the first opening 3121 and coupled to the first moving member 31 through the first connecting block 312. The second screw 222 is rotatably received in the second opening 3222 and coupled to the second moving member 32 through the second connecting block 322. When the first screw 212 rotates, the first moving member 31 moves along the sliding rail 11 through the first connecting block 312. When the second screw 222 rotates, the second moving member 32 moves along the sliding rail 11 through the second connecting block 322.

In one embodiment, the 3D sensing device 100 further includes a circuit board assembly 40. The circuit board assembly 40 includes a first circuit board 41, a second circuit board 42, and a third circuit board 43. The first circuit board 41 is mounted on the first protrusion 12, the second circuit board 42 is mounted on the first moving member 31, and the third circuit board 43 is mounted on the second moving member 32. The first circuit board 41, the second circuit board 42, and the third circuit board 43 are spaced from each other, and the second circuit board 42 is located between the first circuit board 41 and the third circuit board 43. The first circuit board 41, the second circuit board 42, and the third circuit board 43 may be flexible boards, hard boards, or flexible-hard composite boards. In one embodiment, each of the first circuit board 41, the second circuit board 42, and the third circuit board 43 is a hard board.

In one embodiment, the 3D sensing device 100 further includes a connector assembly 50. The connector assembly 50 includes a first connector 51, a second connector 52, and a third connector 53. The first connector 51 and the second connector 52 are both mounted on the first circuit board 41. The third connector 53 is mounted on the third circuit board 43, and the second connector 52 is located between the first connector 51 and the third connector 53.

The infrared emitting module 60 is mounted on the second circuit board 42 and moves with the first moving member 31. The infrared emitting module 60 includes one or more infrared emitting devices. In one embodiment, the infrared emitting module 60 includes two infrared emitting devices. The infrared emitting module 60 can emit infrared light to a target object, and the target object can be a subject, a gesture, or the like. The IR light is reflected by the target object.

The infrared receiving module 70 includes a first infrared receiver 71 and a second infrared receiver 72. The first infrared receiver 71 is mounted on the first circuit board 41 through the first connector 51, and the second infrared receiver 72 is mounted on the third circuit board 43 through the third connector 53. The second infrared receiver 72 moves with the second moving member 32. The first infrared receiver 71 and the second infrared receiver 72 each receive infrared (IR) light reflected by the target object to form an infrared image. The infrared image can be used to determine depth information of the target object.

The color camera module 80 is mounted on the first circuit board 41 through the second connector 52 and located between the infrared emitting module 60 and the first infrared receiver 71. The color camera module 80 captures a color image of the target object. 3D sensing is achieved by combining color image information and depth information. The first protrusion 12 ensures that the infrared emitting module 60, the infrared receiving module 70, and the color camera module 80 are on a same plane.

In one embodiment, the 3D sensing device 100 further includes a housing 90. The housing 90 is fixedly or movably coupled to the base 10. In one embodiment, the housing 90 is movably coupled to the base 10. The housing 90 protects the 3D sensing device 100. The housing 90 is composed of one of plastic, glass, wood, ceramic, metal, composite material, or the like.

In one embodiment, the 3D sensing device 100 further includes an upper cover 91. The upper cover 91 and the housing 90 are fixedly coupled or movably coupled together. In one embodiment, the upper cover 91 and the housing 90 are movably coupled together. The upper cover 91, the housing 90, and the base 10 form an enclosed space for accommodating the driving assembly 20, the moving assembly 30, the infrared emitting module 60, the infrared receiving module 70, and the color camera module 80.

Figure 4:
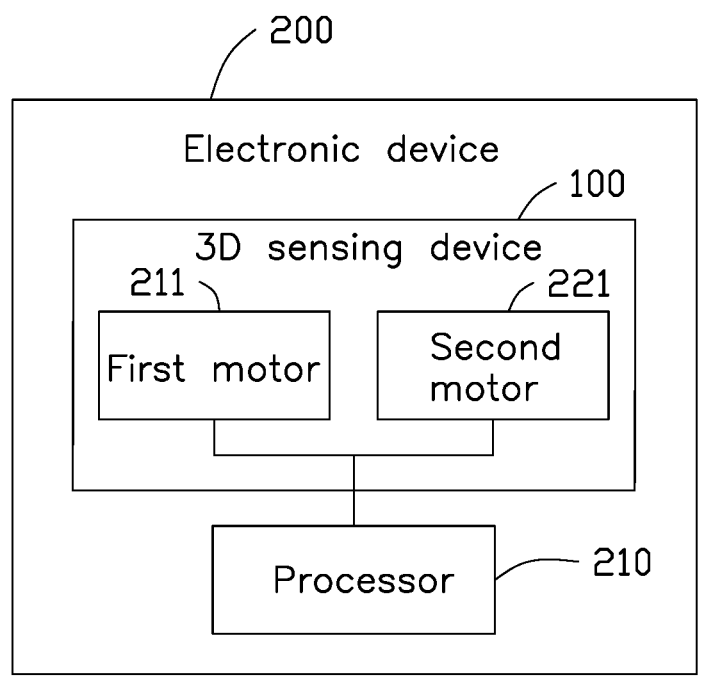
FIG. 4 is a block diagram of an embodiment of an electronic device including the 3D sensing device.

As shown in FIG. 4, an electronic device 200 includes the 3D sensing device 100 and a processor 210. The processor 210 is electrically coupled to the first motor 211 and the second motor 221. The processor 210 may be a set of logical relationships embedded in hardware or firmware, or a series of programs stored in a memory or other firmware written in a programming language. When the breadth and depth of sensing the target object needs to be increased, the processor 210 controls the first motor 211 and the second motor 221 to rotate, so that the first moving member 31 and the second moving member 32 move away from the first protrusion 12, thereby moving the infrared emitting module 60 and the second infrared receiver 72 away from the first infrared receiver 71. The processor 210 further acquires infrared image information of the infrared receiving module 70 and color image information of the color camera module 80, and combines the infrared image information and the color image information to form a composite image. The electronic device 200 may be a structured light depth camera, a somatosensory game machine, or the like.

As described in the embodiments above, an area sensed by the 3D sensing device 100 is expanded by moving the infrared emitting module 60 and the second infrared receiver 72 relative to the first infrared receiver 71 by the moving assembly 30. Thus, a breadth and a depth is increased to achieve broader and deeper image acquisition.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A 3 dimension (3D) sensing device comprising:
a base;
an infrared emitting module;
an infrared receiving module;
a color camera module;
a moving assembly comprising a first moving member and a second moving member; and
a driving assembly comprising a first driving member and a second driving member; wherein:
the infrared emitting module, the infrared receiving module, the color camera module, the moving assembly, and the driving assembly are mounted on the base;
the first moving member and the second moving member are slidably mounted on the base;
the first driving member and the second driving member respectively drive the first moving member and the second moving member to slide along the base;

the infrared emitting module is mounted on the first moving member;
the infrared receiving module comprises a first infrared receiver and a second infrared receiver;
the color camera module is located between the first infrared receiver and the infrared emitter;
the second infrared receiver is mounted on the second moving member;
the first moving member and the second moving member respectively move the infrared emitting module and the second infrared receiver along the base relative to the first infrared receiver.

2. The 3D sensing device of claim 1 further comprising a sliding rail mounted on the base, wherein:
the first moving member and the second moving member move along the sliding rail;
the base comprises a first protrusion protruding from an end portion of the base;
the color camera module and the first infrared receiver are mounted on the first protrusion.

3. The 3D sensing device of claim 2, wherein:
the first driving member and the second driving member are respectively located at opposite sides of the sliding rail;
the first driving member comprises a first motor and a first screw, wherein the first screw is coupled to the first motor;
the first moving member comprises a first connecting block, wherein the first connecting block is located on a side of the first moving member adjacent to the first driving member;
the first connecting block defines a first opening;
the first screw is mounted within the first opening, and the first moving member and the first driving member are coupled together by the first connecting block;
the first motor drives the first screw to rotate to cause the first connecting block to drive the first moving member to move along the sliding rail.

4. The 3D sensing device of claim 2, wherein:
the second driving member comprises a second motor and a second screw, wherein the second screw is coupled to the second motor;
the second moving member comprises a second connecting block, wherein the second connecting block is located on a side of the second moving member adjacent to the second driving member;
the second connecting block defines a second opening;
the second screw is mounted within the second opening, and the second moving member and the second driving member are coupled together by the second connecting block;
the second motor drives the second screw to rotate to cause the second connecting block to drive the second moving member to move along the sliding rail.

5. The 3D sensing device of claim 2 further comprising a circuit board assembly comprising a first circuit board, a second circuit board, and a third circuit board, wherein:
the first circuit board is mounted on the first protrusion;
the second circuit board is mounted on the first moving member;
the third circuit board is mounted on the second moving member;
the first circuit board, the second circuit board, and the third circuit board are spaced apart;
the second circuit board is located between the first circuit board and the third circuit board.

6. The 3D sensing device of claim 5 further comprising a connecting assembly comprising a first connector, a second connector, and a third connector; wherein:
the first connector and the second connector are mounted on the first circuit board;
the third connector is mounted on the third circuit board;
the first infrared receiver is electrically coupled to the first circuit board by the first connector;
the color camera module is electrically coupled to the first circuit board by the second connector;
the infrared emitting module is electrically coupled to the second circuit board by the second connector;
the second infrared receiver is electrically coupled to the third circuit board by the third connector.

7. The 3D sensing device of claim 2, wherein the infrared emitting module, the infrared receiving module, and the color camera module are located on a same surface.

8. An electronic device comprising:
a processor; and
a 3D sensing device comprising:
    a base;
    an infrared emitting module;
    an infrared receiving module;
    a color camera module;
    a moving assembly comprising a first moving member and a second moving member; and
    a driving assembly comprising a first driving member and a second driving member; wherein:
the infrared emitting module, the infrared receiving module, the color camera module, the moving assembly, and the driving assembly are mounted on the base;
the first moving member and the second moving member are slidably mounted on the base;
the first driving member and the second riving member respectively drive the first moving member and the second moving member to slide along the base;
the infrared emitting module is mounted on the first moving member;
the infrared receiving module comprises a first infrared receiver and a second infrared receiver;
the color camera module is located between the first infrared receiver and the infrared emitter;
the second infrared receiver is mounted on the second moving member;
the first moving member and the second moving member respectively move the infrared emitting module and the second infrared receiver along the base relative to the first infrared receiver;
the processor is electrically coupled to the first driving member and the second driving member; and
the processor controls the first driving member and the second driving member to drive the first moving member and the second moving member to move along the base.

9. The electronic device of claim 8, wherein:
the processor is electrically coupled to the infrared emitting module and the infrared receiving module and processes infrared image information generated from the infrared emitting module and the infrared receiving module.

10. The electronic device of claim 9, wherein:
the processor is electrically coupled to the color camera module and processes color image information generated from the color camera module and combines the infrared image information with the color image information to form an image.

11. The electronic device of claim 10, wherein:

the 3D sensing device further comprises a sliding rail mounted on the base;

the first moving member and the second moving member move along the sliding rail;

the base comprises a first protrusion protruding from an end portion of the base;

the color camera module and the first infrared receiver are mounted on the first protrusion.

12. The electronic device of claim 11, wherein:

the first driving member and the second driving member are respectively located at opposite sides of the sliding rail;

the first driving member comprises a first motor and a first screw, wherein the first screw is coupled to the first motor;

the first moving member comprises a first connecting block, wherein the first connecting block is located on a side of the first moving member adjacent to the first driving member;

the first connecting block defines a first opening;

the first screw is mounted within the first opening, and the first moving member and the first driving member are coupled together by the first connecting block;

the first motor drives the first screw to rotate to cause the first connecting block to drive the first moving member to move along the sliding rail.

13. The electronic device of claim 11, wherein:

the second driving member comprises a second motor and a second screw, wherein the second screw is coupled to the second motor;

the second moving member comprises a second connecting block, wherein the second connecting block is located on a side of the second moving member adjacent to the second driving member;

the second connecting block defines a second opening;

the second screw is mounted within the second opening, and the second moving member and the second driving member are coupled together by the second connecting block;

the second motor drives the second screw to rotate to cause the second connecting block to drive the second moving member to move along the sliding rail.

14. The electronic device of claim 11, wherein:

the 3D sensing device further comprises a circuit board assembly comprising a first circuit board, a second circuit board, and a third circuit board;

the first circuit board is mounted on the first protrusion;

the second circuit board is mounted on the first moving member;

the third circuit board is mounted on the second moving member;

the first circuit board, the second circuit board, and the third circuit board are spaced apart;

the second circuit board is located between the first circuit board and the third circuit board.

15. The electronic device of claim 14, wherein:

the 3D sensing device further comprises a connecting assembly comprising a first connector, a second connector, and a third connector;

the first connector and the second connector are mounted on the first circuit board;

the third connector is mounted on the third circuit board;

the first infrared receiver is electrically coupled to the first circuit board by the first connector;

the color camera module is electrically coupled to the first circuit board by the second connector;

the infrared emitting module is electrically coupled to the second circuit board by the second connector;

the second infrared receiver is electrically coupled to the third circuit board by the third connector.

16. The electronic device of claim 11, wherein the infrared emitting module, the infrared receiving module, and the color camera module are located on a same surface.

* * * * *